United States Patent [19]
Clayton

[11] 3,762,436
[45] Oct. 2, 1973

[54] FLUID PRESSURE REGULATOR
[75] Inventor: Robert W. Clayton, Plymouth, Mich.
[73] Assignee: Scans Associates, Inc., Livonia, Mich.
[22] Filed: Apr. 30, 1971
[21] Appl. No.: 138,960

[52] U.S. Cl....... 137/505.35, 137/505.37, 137/510, 251/356
[51] Int. Cl............................. F16k 31/12
[58] Field of Search............... 137/505.37, 505.35, 137/510, 87; 251/333, DIG. 1, 364, 356, 61.3

[56] References Cited
UNITED STATES PATENTS

| | | | |
|---|---|---|---|
| 2,941,543 | 6/1960 | Kleczek | 137/505.37 X |
| 253,984 | 2/1882 | Curtis | 137/181 X |
| 2,860,658 | 11/1958 | Senesky | 137/505.37 |
| 2,047,101 | 7/1936 | Grove | 137/505.37 |

FOREIGN PATENTS OR APPLICATIONS

| | | | |
|---|---|---|---|
| 925,165 | 3/1947 | France | 251/356 |

Primary Examiner—Arnold Rosenthal
Attorney—Learman & McCulloch

[57] ABSTRACT

A fluid pressure regulator for maintaining constant the downstream pressure at varying rates of flow has a chamber divided by a flexible diaphragm into two compartments one of which has an inlet and an outlet through which a first pressure fluid may flow under the control of a flow control valve, the position of the valve being determined by the position of the diaphragm and the position of the diaphragm being determined by the relative pressures of the first fluid and a second fluid in the other compartment of the chamber. The regulator is constructed in such manner as to prevent the accumulation therein of air entrained in the first fluid and the valve is capable of providing a bubble-tight shutoff for the regulator.

11 Claims, 5 Drawing Figures

PATENTED OCT 2 1973

3,762,436

INVENTOR
ROBERT W. CLAYTON

BY
Searman & McCulloch
ATTORNEYS

FLUID PRESSURE REGULATOR

The invention disclosed herein relates to a fluid regulator adapted for use with either liquids or gases and which is capable of maintaining uniform the pressure of fluid discharged from the regulator at varying rates of flow. More particularly, the invention comprises a fluid regulator of the diaphragm type wherein the pressure of fluid discharged from the regulator may be maintained within extremely close tolerances by the pressure of a second fluid acting on the diaphragm.

Fluid regulators of the kind disclosed herein are especially adapted for use in systems such as those disclosed in U.S. Pat. Nos. 3,517,552 and 3,524,344 for the testing and calibrating of carburetors, but the fluid regulators are useful in any system in which precision control over fluid pressure is desirable. If a fluid pressure regulator is to be capable of maintaining the pressure of fluid downstream from the regulator within extremely close tolerances, it must be capable of responding quickly and automatically to both large and small variations in the pressure both upstream and downstream of the regulator. That is, the regulator must be responsive to both increases and decreases in the pressure of the influent and effluent fluid so as maintain virtually constant the pressure of the effluent fluid.

Virtually all liquids include some absorbed air, the quantity of which, according to Henry's Law, is proportional to the absolute pressure of the liquid. As liquid containing air is subjected to a reduced pressure, such as when the liquid passes a valve to a pressure regulator housing, the air has a tendency to separate from the liquid. If the air separates from the liquid in the regulator, it can produce bubbles which, eventually, are discharged from the regulator resulting in extremely sharp pressure fluctuations which make it impossible to maintain constant the pressure of liquid discharged from the regulator.

Among the objects of this invention is to provide a fluid regulator wherein the flow of fluid through the regulator is under the direct and automatic control of a valve which is operated in response to deflection of a flexible diaphragm acted upon by a static pressure, the deflection of the diaphragm being so related to the pressure of fluid admitted to and discharged from the regulator that for any given value of the static pressure applied to the diaphragm the pressure of fluid discharged from the regulator is virtually constant.

Another object of the invention is to provide a fluid regulator which prevents the accumulation of air in the regulator.

Another object of the invention is to provide a novel valve for controlling the flow of fluid through a fluid regulator and wherein the valve is operable to assure a bubble-tight shutoff.

A further object of the invention is to provide a novel diaphragm for use in a diaphragm-controlled fluid regulator and which is capable of providing a stable, regulated pressure over a wide range of varying flow and pressure conditions, including extremely low pressures.

Another object of the invention is to provide a fluid regulator which is capable of accommodating greatly varying flow and pressure ranges with excellent reproducibility.

Other objects and advantages of the invention will be pointed out specifically or will become apparent from the following description when it is considered in conjunction with the appended claims and the accompanying drawings, in which:

Figure 1:
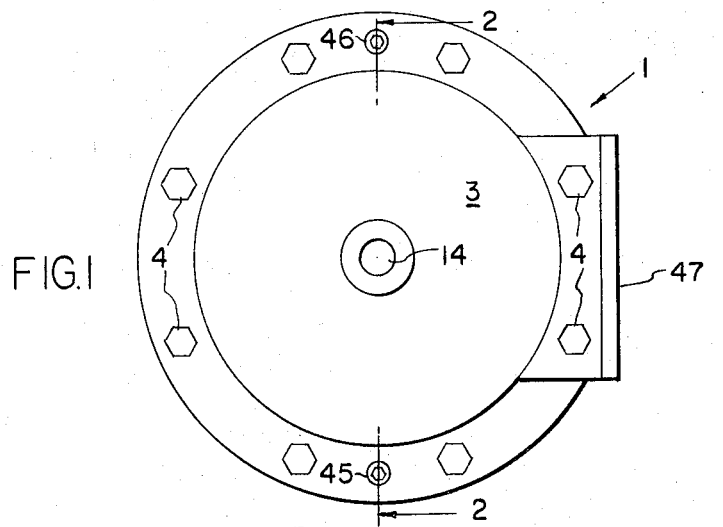
FIG. 1 is a plan view of a regulator constructed according to one embodiment of the invention.

A regulator constructed according to the invention comprises a housing 1 having a body 2 and a cover 3 separably secured to one another by bolts 4. The confronting surfaces of the body and the cover are recessed to form a chamber 5 which is divided into two compartments 6 and 7 by a flexible diaphragm 8. The diaphragm comprises a disc-like web 9 of woven fabric such as nylon impregnated with a substance such as neoprene which is impervious to gas and oil. The marginal edge of the web 9 is interposed and sealed between the parts 2 and 3. Metal plates 10 of a flexible material such as aluminum are bonded to opposite sides of the member 9 for a purpose presently to be explained. At the center of the diaphragm is a shoulder screw 11 having a head 12 at one end and a nut 13 threaded on its other end, the head and nut compressing seals interposed therebetween and the diaphragm.

At the center of the cover 3 is a port 14 which communicates with the compartment 6. Except for the port 14 the compartment 6 is completely closed.

In axial alignment with the port 14 the body 2 has a bore 15 in which is mounted a guide bushing 16 and a valve sleeve 17 having an orifice or inlet 18 in communication with the compartment 7. Slidably accommodated in the bushing 16 is a flow control member or valve body 19 having a nose 20 at one end adapted to be accommodated in the bushing 17. The end of the sleeve 17 which confronts the nose 20 of the valve body 19 is tapered to form a seat 21 and the nose of the valve body is annularly grooved as at 22 to receive a molded nipple 23 that is bonded to the valve body. The nipple is formed of a rubbery, resilient material such as neoprene that is impervious to oil and gas and preferably has a durometer hardness of between 45 and 55.

It is important that the valve seat 21 be concentric with the nipple 23 and that the confronting surfaces of the seat and the nipple be smooth so as to avoid any leakage of fluid past the nipple when the latter is seated on the seat 21 and to avoid pressure fluctuations due to such leakage. The bore 15, the bushing 16, the sleeve 17, the seat 21 and the nipple 23 all must be concentric, therefore, to enable such leakage to be prevented.

At the outer end of the bore 15 is a closure plug 24 that is maintained assembled with the body 2 by a retaining ring 25. A spring 26 reacts between the plug 24 and the valve body 19 and constantly urges the latter toward sealing relation with the sleeve 17.

The body 2 has a pressure fluid inlet passage 27 which communicates with the compartment 7 via the bore 15 and the inlet 18. The inlet passage 27 has a branch 29 which establishes communication between the passage 27 and the bore 15 at the outer end of the latter.

Figure 2:
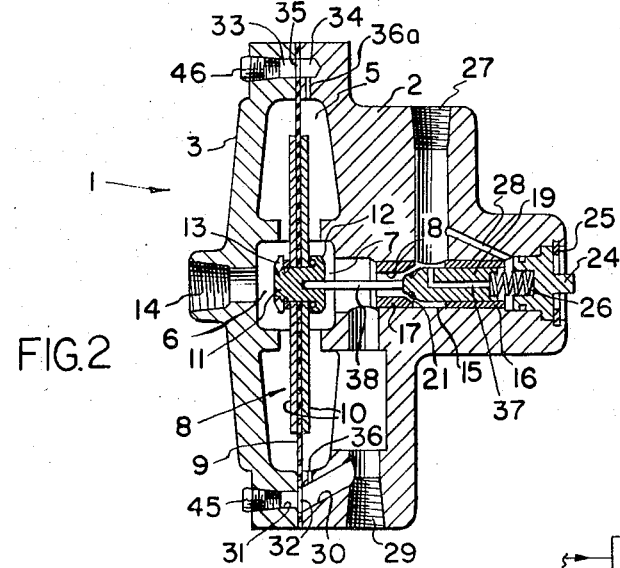
FIG. 2 is a sectional view taken on the line 2—2 of FIG. 1.

In the embodiment shown in FIG. 2, the body 2 has an outlet passage 29 the inner end of which communicates with the compartment 7. A branch 30 communicates at one end with the passage 29 and at the other end communicates with a passage 31 in the cover 3 via an opening 32 in the diaphragm member 9. A passage 33 similar to the passage 31 also is provided in the cover 3 at the opposite side of the latter, the inner end of the passage 33 communicating with a passage 34 in the body 2 via an opening 35 in the diaphragm member 9. A vent port 36 establishes communication between the compartment 7 and the passage 30 and a similar port 36a establishes communication between the compartment 7 and the passage 34. The purpose of the ports will be explained hereinafter.

The valve body 19 has a right angle passage 37 therein which communicates at one end with the inlet passage 27 and at the other end with the branch passage 28 via the bore 15. The purpose of the passage 37 also will be explained hereinafter.

Coupling the diaphragm 8 and the valve 19 is an actuating member 38 comprising a rigid rod having its opposite ends freely accommodated in recesses formed in the members 12 and 19, respectively. The length of the rod 38 is such that, when the diaphragm 10 is in its normal or non-deflected position, the inlet 18 of the sleeve 17 is sealed by the valve body 19.

Figure 3:
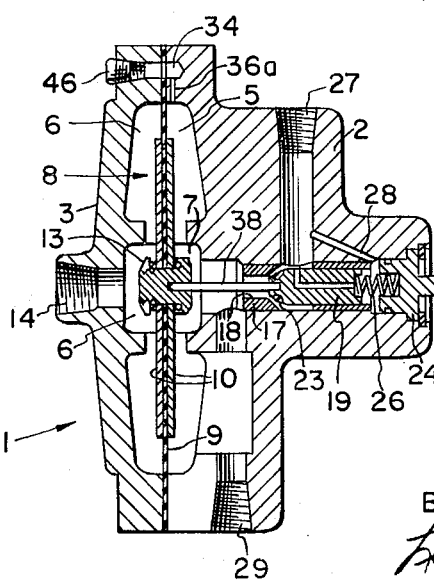
FIG. 3 is a view similar to FIG. 2, but illustrating a modified embodiment.

The embodiment of the invention shown in FIG. 3 is the same as the embodiment shown in FIG. 2 except that the embodiment of FIG. 3 does not include the parts 30, 31, 32, and 36. In all other respects, however, the two embodiments are identical and corresponding reference characters designate corresponding parts.

Figure 5:
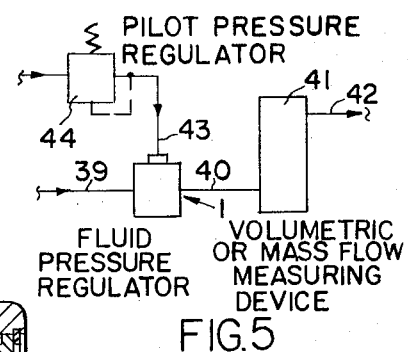
FIG. 5 is a schematic diagram illustrating the manner in which either of the fluid regulators may be incorporated in a typical fluid system.

Apparatus constructed according to either embodiment of the invention is adapted to be installed in a system diagrammatically disclosed in FIG. 5. The fluid pressure regulator housing 1 is adapted to have its inlet 27 connected to a tube 39 through which either a liquid or a gas may be delivered from a source (not shown) thereof under pressure. The outlet 29 of the housing 1 may be connected by a tube 40 to the inlet of a device 41 of known construction, such as a volumetric or mass flow device, the outlet of which may be connected by a tube 42 to a carburetor (not shown) to be tested or calibrated or to any other suitable device. The passage 14 of the housing 1 is adapted to be connected by a tube 43 to a second source (not shown) of pressure fluid which may be either a liquid or a gas. The tube 43 will include a conventional fitting (not shown) by means of which the compartment 6 may be purged of air. A pilot pressure regulator 44 of known construction is positioned in the tube 43 for controlling the pressure of the pilot fluid delivered through the tube 43 to the compartment 6 of the housing 1.

When the apparatus is installed in a system in the manner indicated in FIG. 5, it may be conditioned for operation by admitting fluid from the source of pilot fluid to the compartment 6 under such pressure as to overcome the force of the spring 26 and cause deflection of the diaphragm 8 to the right, as viewed in FIG. 2, whereupon the valve actuator rod 38 will displace the valve body 19 to the right so as to establish communication between the passage 27 and the compartment 7 via the inlet 18. As the fluid to be controlled enters the passage 27 from the source of such fluid, some of the fluid will flow immediately into the compartment 7 and some of the fluid will flow through the passage 28 into the outer end of the bore 15 and thence through the passage 37 so as to purge air from the bore 15. Fluid which enters the compartment 7 will fill the latter and drive any air in the compartment through the ports 36 and 36a so as to purge the compartment. Thereafter, plugs 45 and 46 may be fitted into the passages 31 and 33, respectively, so as to seal the latter, whereupon fluid may flow from the compartment 7 only through the outlet 29. It will be understood, however, that the outlet 29 could be closed by a plug (not shown) and the plug 45 omitted, whereupon fluid will flow from the compartment 7 through the branch outlet passage 30. The passages 29 and 30 are of different diameters so as to provide for different maximum rates of fluid flow through the regulator.

The position of the valve body 19 depends upon the amount of deflection of the diaphragm 8 and the amount of deflection of the diaphragm depends upon the pressure of fluid in the compartment 6 and the pressure of fluid in the compartment 7. The fluid pressure in the compartment 6 must be sufficient, of course, to overcome the force of the spring 26 so as to effect opening of the valve in the first instance. Once the valve is open, the pressure of fluid admitted to the compartment 7 will act in opposition to the pressure in the compartment 6 until such time as a condition of equilibrium exists. When such equilibrium is reached, a rate of flow of fluid through the regulator housing 1 at a desired pressure will be established.

When the fluid flow through the regulator housing 1 is established, any increase in the pressure of fluid in the compartment 7, such as may be caused by a surge upstream of the regulator or by a fluid flow reduction downstream of the regulator, will cause the diaphragm 8 to be deflected to the left, as viewed in FIGS. 2 and 3. The spring 26 will cause a corresponding movement of the valve 19 and effect a partial closing of the inlet 18, thereby decreasing the quantity of fluid admitted to the compartment 7 and preventing an increase in the pressure of the fluid discharged from the compartment 7. Conversely, a decrease in the pressure of fluid in the compartment 7, caused by pressure reduction either upstream or downstream from the regulator, will enable the pressure of the pilot fluid in the compartment 6 to displace the diaphragm 8 to the right, as viewed in FIGS. 2 and 3, so as to cause a corresponding movement of the valve 19 and increase the quantity fo fluid admitted to the compartment 7, thereby preventing a reduction in the pressure of fluid discharged from the compartment 7.

In the event the pressure of the pilot fluid in the compartment 6 should fail, the pressure of fluid in the compartment 7 will displace the diaphragm 8 to the left, as viewed in FIGS. 2 and 3, thereby enabling the spring 26 to move the valve 19 onto its seat 21 and terminate the flow of fluid through the regulator. The resilient nipple 23 will provide a completely tight, bubble-free seal with the valve seat 21 so as to prevent any leakage of fluid past the valve. Consequently, no additional shut-off valve is required.

The pilot fluid which is introduced to the compartment 6 may be either a gas or a liquid, the pressure of which may be maintained virtually constant by the pilot pressure regulator 44. The fluid which passes through the regulator housing 1 also may be either a gas or a liquid. If such fluid is a liquid, it is almost certain to contain a quantity of absorbed air or other gas which has a tendency to separate from the fluid as it passes through the regulator, inasmuch as there inevitably will be pressure drop across the regulator. Any irregular surfaces in the body 2 thus may form pockets in which air may accumulate until such time as a bubble exists which is sufficiently large to be washed out of the regulator by fluid flowing therethrough. The various ports and passages and the compartment 7 should have smooth surfaces so as to prevent the formation of pockets in which air can accumulate.

The passages 28 and 37 act not only to purge air from the outer end of the valve body 19, but also to prevent the accumulation behind the valve of air which may be released from the fluid. The presence of air at the outer end of the valve is objectionable because movement of the valve inwardly would be opposed by suction, and movement of the valve outwardly would be opposed by compression of the air. The passages 28 and 37 permit any air bubbles which may tend to accumulate behind the valve to be washed out by fluid flowing through these passages, thereby making it possible for the position of the valve to be responsive solely to differential pressures in the compartments 6 and 7 and the spring 26. It thus is relatively easy to calibrate the pressure which must be maintained in the compartment 6 to maintain a flow of fluid through the regulator such as to establish and maintain a desired pressure of the effluent fluid. The ratio of the two pressures may be one to one, is desired.

As has been stated hereinbefore, the diaphragm member 9 preferably comprises a web woven from fabric such as nylon and impregnated with neoprene. The fabric has some elasticity in the directions of the woof and warp fibers, but such elasticity is considerably less that that possessed by the fabric in directions diagonally of the warp and woof fibers. Since the chamber 5 is circular, the diaphragm 8 also must be circular and, consequently, deflection of the diaphragm causes forces to be exerted on the member 9, some of which forces are diagonal of the warp and woof fibers. Since the member 9 has greater elasticity in the diagonal directions, it is possible that the member 9 could become distorted and form pockets for the reception and accumulation of air released from a liquid. It is to overcome the tendency of the member 9 to distort that the metal plates 10 are provided, and the area of the plates 10 should be only sufficiently less than the area of the member 9 to assure substantially instantaneous deflection of the diaphragm in response to slight changes in differential pressures on opposite sides of the diaphragm. Thus, if the diameter of the chamber 5 is 6 inches, for example, the diameter of the plates 10 may be 5 inches, thereby providing an annular space of one-half inch around the plates. The distortion of which the member 9 is capable thus is minimized to a virtually insignificant amount.

Figure 4:
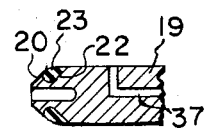
FIG. 4 is an enlarged, fragmentary, sectional view of a valve incorporated in each of the embodiments shown in FIGS. 2 and 3.

The construction of the sealing nipple 23 is an important characteristic of the invention. As is shown in FIG. 4, the nipple 23 has a generally tear-drop shape in cross-section and is bonded in the groove 22. The shape and bonding of the nipple prevent it from vibrating, as often happens with conventional O-rings, and also avoids elastic rebound such as occurs with O-rings. The bonding of the nipple also precludes its being stripped or blown off the valve in the event of an unusually large pressure change.

The regulators disclosed herein may be mounted directly in the fluid line extending from the fluid source to the flow measuring device, is desired. Alternatively, the regulators may be mounted on a stand by means of a bracket 47 which may be fixed to the housing 1 by two or more of the bolts 4. If the regulator is mounted on a stand, the fluid lines, of course, will have to be arranged in such manner as to lead to and from the housing.

Due to the ability of the diaphragm 8 to respond substantially instantaneously to any change in differential pressures on opposite sides of the diaphragm and thereby effect a substantially instantaneous adjustment of the valve 19, and due to the prevention of the accumulation of air bubbles in the regulator, the pressure of the fluid discharged from the pressure regulator may be maintained extremely stable, thereby enabling the regulator to be particularly well suited for utilization in testing and calibrating carburetors or any other device wherein the pressure of a fluid delivered to such a device must be maintained within close tolerances over large variations in flow ranges.

The disclosed embodiments are representative of the presently preferred forms of the invention, but are intended to be illustrative rather than definitive thereof. The invention is defined in the claims.

What is claimed is:

1. Fluid pressure regulating apparatus comprising a housing having a chamber therein; flexible diaphragm means dividing said chamber into two opposed compartments; means for establishing a first pressure in one of said compartments; a bore in said housing establishing at one end thereof an inlet to the other of said compartments; means sealing the other end of said bore; a fluid passage communicating with said bore for introducing a pressure fluid via said inlet to the other of said compartments to establish a second pressure therein opposing said first pressure; first passage means in said housing separate from said fluid passage and said bore having one end thereof communicating with said fluid passage and having its other end communicating with said bore adjacent the sealed end thereof; a valve member slidably mounted in said bore and movable in opposite directions to open and close said inlet; spring means acting on said valve member and urging the latter in a direction to close said inlet; valve actuating means coupling said diaphragm means and said valve member and operable in response to an increase in said first pressure relative to said second pressure to move said valve member in a direction to open said inlet; second passage means establishing communication between said fluid passage and said other end of said bore; and outlet means communicating with said other compartment for discharging fluid therefrom.

2. Apparatus according to claim 1 wherein said valve means comprises a body having a nose adapted to seal and unseal said inlet.

3. Apparatus according to claim 2 wherein said nose carries a resilient member adapted to seat on the edges of said inlet.

4. Apparatus according to claim 3 wherein said resilient member is fitted in a groove in said nose and is bonded thereto.

5. Apparatus according to claim 4 wherein said resilient member has a substantially tear drop shape in cross-section.

6. Apparatus according to claim 1 including normally closed ports in said housing for venting said second compartment and means for selectively opening and closing said ports.

7. Apparatus according to claim 1 wherein said diaphragm means comprises a flexible fabric having an area corresponding to the area of said chamber, and at least one flexible metal member bonded concentrically to said fabric and having an area less than that of said fabric.

8. Apparatus according to claim 1 wherein said second passage means is in said valve member.

9. Fluid pressure regulating apparatus comprising a housing having a chamber therein; flexible diaphragm means dividing said chamber into two opposed compartments; means for establishing a first pressure in one of said compartments; a bore in said housing establishing at one end thereof an inlet to the other of said compartments; means sealing the other end of said bore; a fluid passage communicating with said inlet for introducing a pressure fluid via said inlet to the other of said compartments to establish a second pressure therein opposing said first pressure; passage means establishing communication between said fluid passage and said bore adjacent the sealed end thereof; a valve member slidably mounted in said bore and movable in opposite direction to open and close said inlet; spring means acting on said valve member and urging the latter in a direction to close said inlet; valve actuating means coupling said diaphragm means and said valve member and operable in response to an increase in said first pressure relative to said second pressure to move said valve member in a direction to open said inlet; and outlet means communicating with said other compartment for discharging fluid therefrom, said passage means comprising a branch communicating with said bore adjacent said sealed end thereof, and wherein said valve member has a passage therein establishing communication between said fluid passage and said branch.

10. Apparatus according to claim 9 wherein said valve member has a nose adapted to seat on said inlet, said nose including a resilient sealing member concentric with said valve member and with said inlet.

11. Apparatus according to claim 10 wherein said resilient sealing member is bonded to said valve member.

* * * * *